(12) United States Patent
Van Mill et al.

(10) Patent No.: US 6,176,504 B1
(45) Date of Patent: Jan. 23, 2001

(54) SHORT STEER WAGON

(75) Inventors: Michael D. Van Mill, Shell Rock; Philip J. Kenkel, Cedar Falls, both of IA (US)

(73) Assignee: Unverferth Manufacturing Company, Inc., Kalida, OH (US)

( * ) Notice: Under 35 U.S.C. 154(b), the term of this patent shall be extended for 0 days.

(21) Appl. No.: 09/399,099

(22) Filed: Sep. 20, 1999

Related U.S. Application Data

(60) Provisional application No. 60/101,950, filed on Sep. 25, 1998.

(51) Int. Cl.[7] .................................................. B62D 13/00
(52) U.S. Cl. ............................................................ 280/444
(58) Field of Search ........................... 180/24.01, 265; 280/81.6, 408, 444

(56) References Cited

U.S. PATENT DOCUMENTS

| | | |
|---|---|---|
| 2,453,311 | 11/1948 | Fedevich . |
| 2,918,982 | 12/1959 | Vlachos . |
| 3,455,572 * | 7/1969 | Wolf .................................. 280/444 |
| 3,695,628 * | 10/1972 | Fisher ................................ 280/103 |
| 5,090,719 | 2/1992 | Hanaoka . |
| 5,477,937 | 12/1995 | Chagnon . |

FOREIGN PATENT DOCUMENTS 2300839    11/1996  (GB) .

* cited by examiner

*Primary Examiner*—Christopher P. Schwartz
(74) *Attorney, Agent, or Firm*—Rothwell, Figg, Ernst & Manbeck

(57) ABSTRACT

A short steer wagon having an improved turning capability, including a pair of wheels at each of opposed ends, a tongue having a rear portion connected to a frame of the wagon and having a front portion adapted for connection to a vehicle, at least one of the pair of wheels being steerable to right and left sides and connected to a rear portion of a corresponding tongue for steering, with a wheel having a leading edge facing toward an end of the wagon and a trailing edge facing toward a central portion of the wagon, the wagon having a longitudinal frame member on each side, each longitudinal frame member having an outer edge portion on an intermediate portion of the longitudinal member, the steerable wheels being completely outside the longitudinal frame members when the steerable wheels are oriented in a straight running direction, and each longitudinal frame member including an inwardly oriented indentation adjacent the trailing edge of each corresponding steerable wheel, each of the indentations allowing the corresponding steerable wheel to be turned so that the trailing edge of the corresponding steerable wheel is positioned inwardly with respect to the outer edge portion of a corresponding longitudinal frame member.

8 Claims, 3 Drawing Sheets

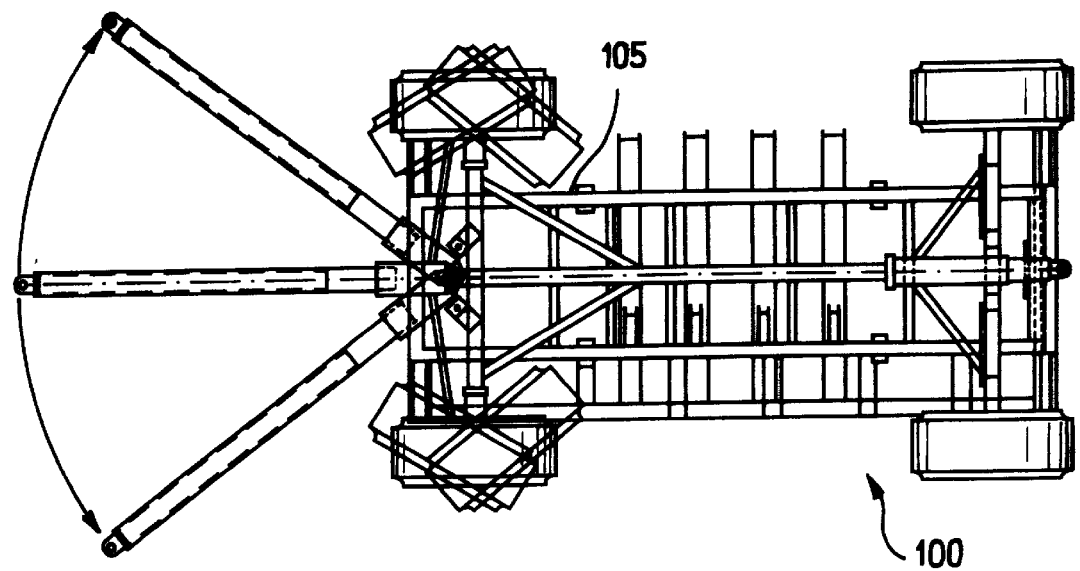
FIG_1
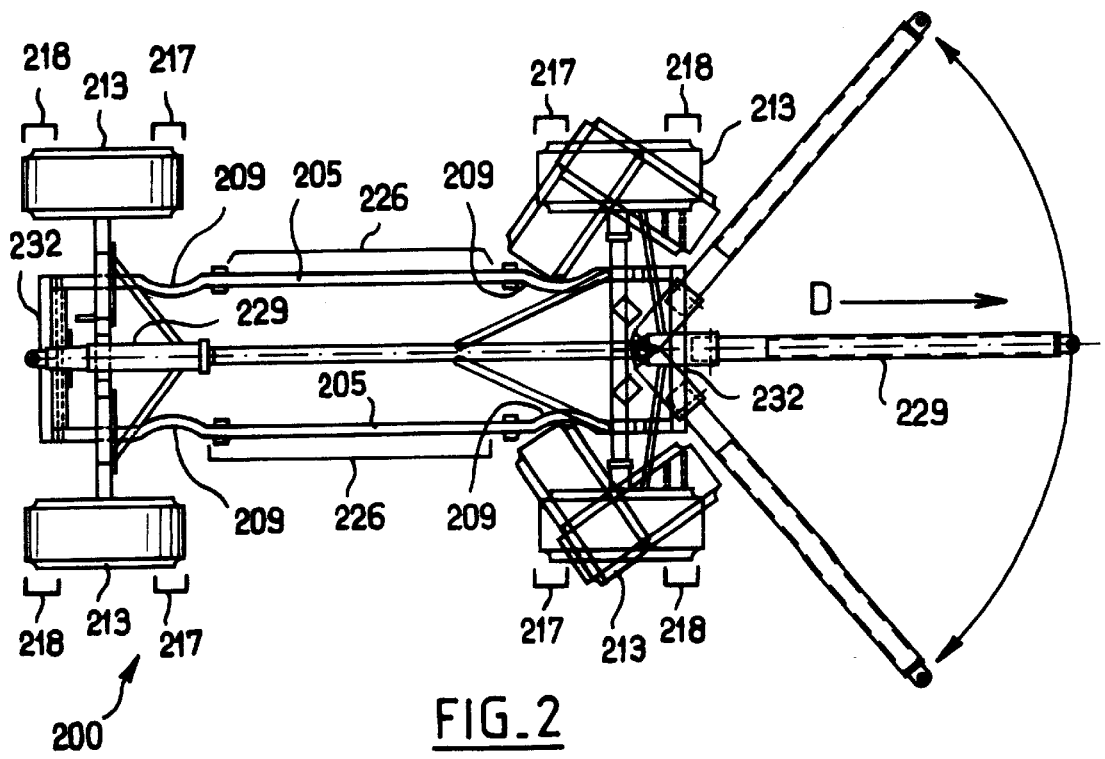
FIG_2

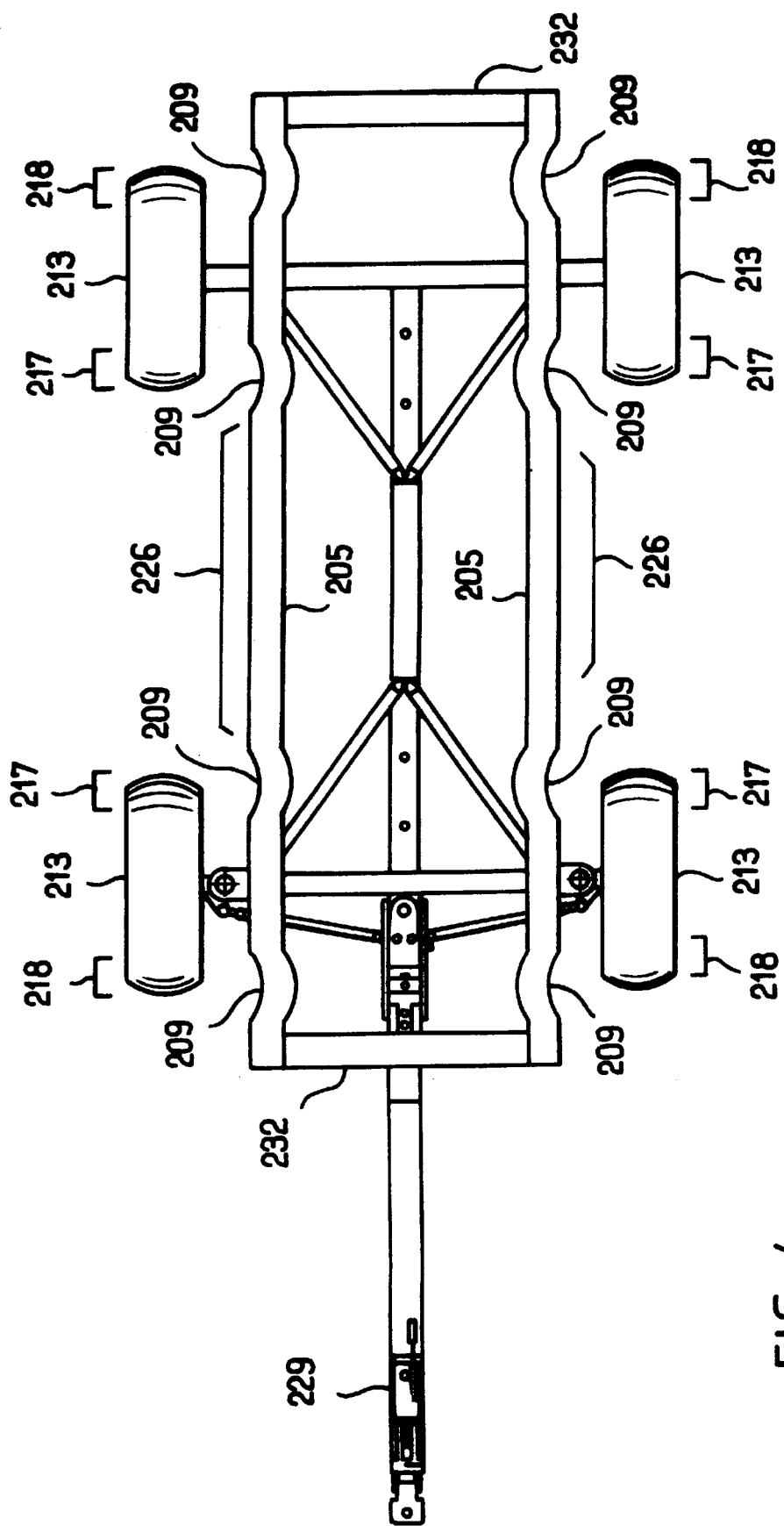
FIG_4

SHORT STEER WAGON

CROSS-REFERENCE TO RELATED APPLICATION

The present application claims priority from, and the benefit of the filing date of, U.S. Provisional Patent Application Ser. No. 60/101,950, filed Sep. 25, 1998.

BACKGROUND OF THE INVENTION

1. Field of the Invention

The present invention relates to the field of wagon technology.

2. Description of the Background Art

Wagons are a traditionally and widely used form of transportation. Wagons are used to carry a wide variety of goods, including grains, livestock, dry goods, persons, liquids, machinery, etc.

Wagons in their most basic form include a tongue, a frame, at least one pair of wheels, and a bed, box, or tank for hauling cargo. The tongue of the wagon may be connected to a vehicle, such as, for example, a tractor, truck, pickup harvester, or other self-propelled machine. A variety of wheels may be used, depending on the intended use.

A common variation is the four-wheeled wagon, having pairs of wheels at either end of the wagon. The extra pair of wheels contribute to stability of the wagon and may also increase the load-carrying capacity. In a four-wheeled wagon, generally one pair of steerable wheels is capable of being pivoted in unison so that the wagon may be turned. The turning action is controlled by the tongue, which pivots the steerable wheels (i.e., the front wheels) by means of a steering rod or rods which connect the tongue to each steerable wheel. As the tongue is displaced to either side of a center position, both steerable wheels are therefore pivoted.

In a conventional wagon construction, a frame is employed upon which the pairs of wheels are mounted. The tongue is pivotally attached to the front of the frame and connected to the steerable wheels through a steering linkage. The wheels and corresponding axles extend beyond the frame, but are positioned relatively near to the frame. This is because if the wheels extended far beyond the frame, excessive bending loads would be imposed on the axles, with possible breakage occurring as a result of heavy loads or due to traveling over rough roads or rough ground. Conventional wagon designs therefore have a frame positioned generally within about one-half of the wheel diameter from the wheel.

A steerable wheel mounted close to the wagon frame has a drawback. The proximity of the frame limits the ability of the steerable wheels to pivot, and thereby limits the turning radius of the wagon. Turning ability is therefore limited in either direction.

What is needed therefore is a wagon having improved turning ability without positioning the steerable wheels farther from the wagon frame.

SUMMARY OF THE INVENTION

A short steer wagon having an improved turning capability is provided according to the invention. The wagon comprises a pair of wheels at each of opposed ends, a tongue having a rear portion connected to a frame of the wagon and having a front portion adapted for connection to a vehicle, at least one of the pair of wheels being steerable to right and left sides and connected to a rear portion of a corresponding tongue for steering, with a wheel having a leading edge facing toward an end of the wagon and a trailing edge facing toward a central portion of the wagon, the wagon having a longitudinal frame member on each side, each longitudinal frame member having an outer edge portion on an intermediate portion of the longitudinal member, the steerable wheels being completely outside the longitudinal frame members when the steerable wheels are oriented in a straight running direction, and each longitudinal frame member including an inwardly oriented indentation adjacent the trailing edge of each corresponding steerable wheel, each of the indentations allowing the corresponding steerable wheel to be turned so that the trailing edge of the corresponding steerable wheel is positioned inwardly with respect to the outer edge portion of a corresponding longitudinal frame member.

BRIEF DESCRIPTION OF THE DRAWINGS

FIG. 1 is a top elevational view of a wagon configuration of the related art;

FIG. 2 is a top elevationaL view of a short steer wagon configuration in accordance with one embodiment of the present invention;

FIG. 4 is a top elevational view of a short steer wagon having longitudinal frame members that extend beyond the leading edges of the steerable wheels.

DETAILED DESCRIPTION OF THE PREFERRED EMBODIMENTS

Figure 3:
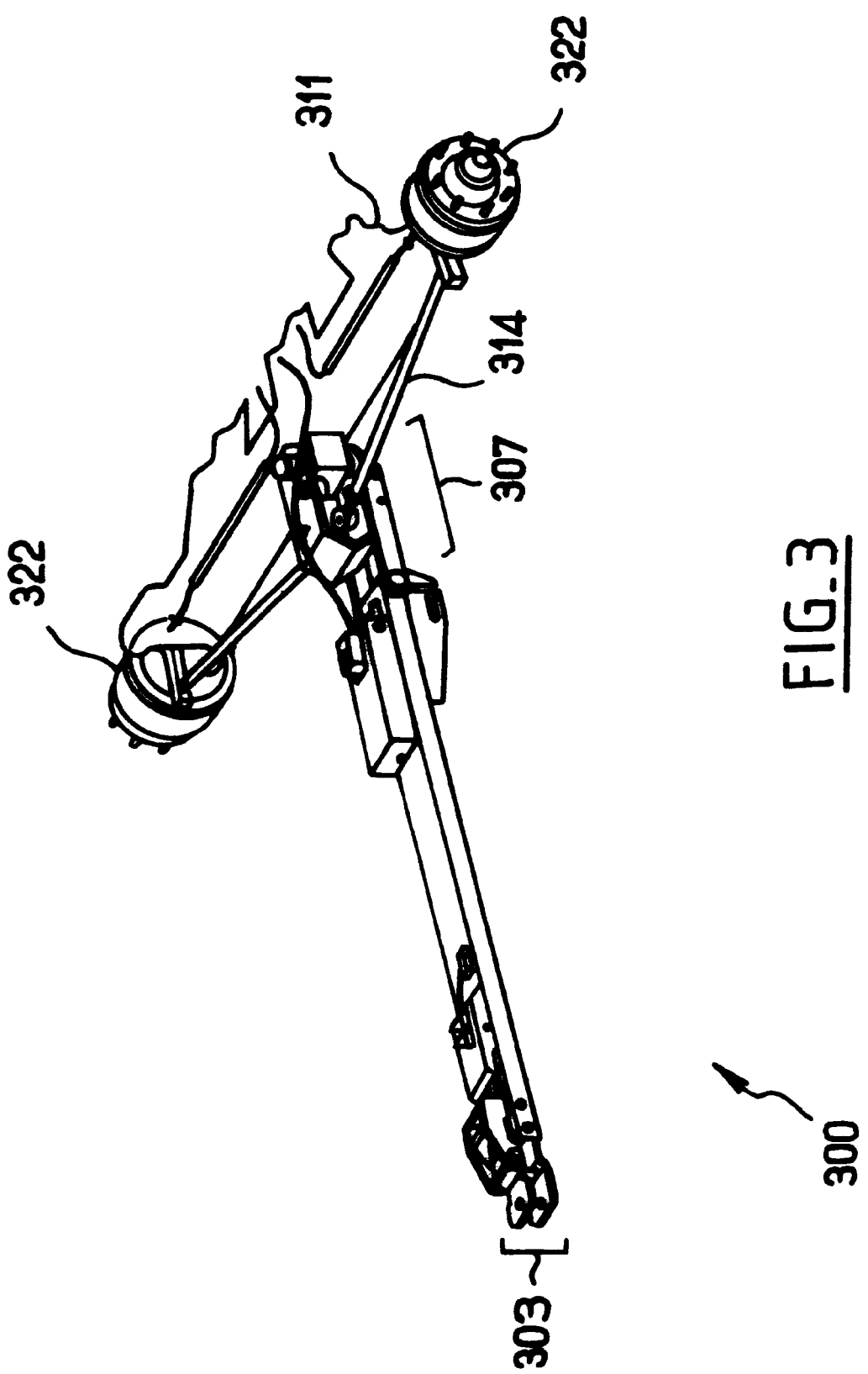
FIG. 3 is a perspective view of a tongue for use with the present invention.

FIG. 1 shows a wagon 100 configuration of the related art, illustrating the turning limitation imposed on the related art wagon 100 by the frame member 105. The related art wagon 100 is generally limited to a tongue pivot displacement of about thirty-six degrees.

FIG. 2 shows a wagon 200 in accordance with one embodiment of the present invention. The longitudinal frame members 205 include outer edge portions 226 and pairs of inwardly oriented indentations 209. The pairs of inwardly oriented indentations 209 are located adjacent trailing edges 217 of corresponding pairs of steerable wheels 213. An inwardly oriented indentation 209 allows a corresponding steerable wheel 213 to pivot to a point that is inward of the outer edge portion 226 of the longitudinal frame member 205. A tongue 229 is connected to a pair of steerable wheels 213, with the pair of steerable wheels 213 being displaced to either side as the tongue 229 is displaced from a center position. In the center position, the tongue 229 steers the wagon 200 in a straight running direction, as shown by the arrow D.

In a first embodiment, one pair of inwardly oriented indentations 209 are formed on the wagon 200. In a second embodiment, both pairs of wheels 213 are steerable and therefore pairs of inwardly oriented indentations 209 are formed adjacent to trailing edges 217 of both pairs of steerable wheels 213. When the wagon 200 has two pairs of steerable wheels 213, the wagon 200 must also have two tongues 229 with which to steer the two pairs of steerable wheels 213.

In order to make the steerable wheels 213 unobstructed along their leading edges 218, lateral frame members 232 extend across each end of the wagon 200, and may be positioned adjacent to a leading edge 218 of a steerable wheel 213. Therefore, the leading edge 218 of a steerable wheel 213 may be positioned inwardly with respect to the outer edge portion 226 of a longitudinal frame member 205.

FIG. 3 shows a wagon tongue 229 for use with an embodiment of the present invention. The tongue 229 has a front portion 303 for connecting the wagon 200 to a propulsion vehicle (not shown), and a rear portion 307 for connecting the tongue 229 to a wagon frame 311. A steering linkage 314 is pivotally attached to the tongue 229 and to the wheel hubs 322, while the wheel hubs 322 are pivotally attached to the frame 311. Therefore, as the tongue 229 is displaced to either side of a center position, both wheel hubs 322 are pivoted in order to steer the wagon 200.

FIG. 4 shows yet another embodiment wherein the longitudinal frame members 205 extend beyond the leading edges 218 of the steerable wheels 213. The extended longitudinal frame members 205 therefore include indentations 209 corresponding to both the leading edges 218 and trailing edges 217 of a steerable wheel 213, allowing greater turning ability despite the extension of the longitudinal frame members 205 past the leading edges 218.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A wagon having two opposed ends and two opposed sides extending between the opposed ends, the wagon further comprising:

a pair of wheels at each of said opposed ends;

a frame having at least one longitudinal frame member a tongue having a rear portion connected to a frame of said wagon and having a front portion adapted for connection to a vehicle;

at least one said pair of wheels being steerable to right and left sides and connected to a rear portion of said tongue for steering with said tongue, with a wheel having a leading edge facing toward an end of said wagon and a trailing edge facing toward a central portion of said wagon;

said wagon having a longitudinal frame member on each side, each longitudinal frame member having an outer edge portion on an intermediate portion of said longitudinal frame member;

said steerable wheels being completely outside said longitudinal frame members when said steerable wheels are oriented in a straight running direction; and each longitudinal frame member including an inwardly oriented indentation adjacent said trailing edge of each corresponding steerable wheel, each said indentation allowing said corresponding steerable wheel to be turned so that said trailing edge of said corresponding steerable wheel is positioned inwardly with respect to said outer edge portion of a corresponding longitudinal frame member.

2. The wagon of claim 1, wherein a lateral frame member extends across each end of said wagon, with said lateral frame member being positioned adjacent to said leading edge of said steerable wheel wherein said steerable wheel can be turned so that said leading edge of said steerable wheel is positioned inwardly with respect to said outer edge portion of a corresponding longitudinal frame member.

3. The wagon of claim 1 wherein both pairs of said wheels are steerable to right and left sides, with said longitudinal frame members having corresponding indentations for each of said steerable wheels.

4. The wagon of claim 3, wherein a lateral frame member extends across each end of said wagon, with said lateral frame member being positioned adjacent to said leading edge of said steerable wheel wherein each said steerable wheel can be turned so that said leading edge of said steerable wheel is positioned inwardly with respect to said outer edge portion of a corresponding longitudinal frame member.

5. The wagon of claim 1, wherein said indentations permit a greater turning angle for said pair of wheels than would be obtainable without said indentations.

6. The wagon of claim 1, wherein each said longitudinal frame member extends beyond said leading edge of said corresponding steerable wheel, and each said longitudinal frame member has a pair of inwardly oriented indentations adjacent to said leading edge and said trailing edge of said steerable wheel.

7. The wagon of claim 1, wherein said wagon has a tongue at each of said opposed ends, with each pair of steerable wheels of said wagon being connected to a corresponding tongue for steering said steerable wheels.

8. The wagon of claim 7, wherein a direction of travel of said wagon may be reversed by utilizing an opposite tongue.

\* \* \* \* \*